(12) United States Patent
Hutterer et al.

(10) Patent No.: US 8,876,192 B2
(45) Date of Patent: Nov. 4, 2014

(54) AERODYNAMICALLY EFFECTIVE DEVICE FOR A MOTOR VEHICLE

(75) Inventors: Armin Hutterer, Hebertshausen (DE); Stephan Mueller, Munich (DE); Horst Dietewich, Reichertshausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/528,183

(22) Filed: Jun. 20, 2012

(65) Prior Publication Data

US 2012/0326468 A1      Dec. 27, 2012

(30) Foreign Application Priority Data

Jun. 21, 2011   (DE) .......................... 10 2011 077 914

(51) Int. Cl.
*B62D 37/02*      (2006.01)

(52) U.S. Cl.
USPC ..................................................... 296/180.5

(58) Field of Classification Search
USPC ............ 296/180.1–180.5, 191; 280/768, 849, 280/762
See application file for complete search history.

(56) References Cited

U.S. PATENT DOCUMENTS

| | | | |
|---|---|---|---|
| 5,061,007 A | | 10/1991 | Simpson |
| 6,378,932 B1 * | 4/2002 | Fasel et al. ................. | 296/180.5 |
| 6,382,694 B1 * | 5/2002 | Rankin et al. .............. | 296/65.16 |
| 6,540,282 B2 * | 4/2003 | Pettey ......................... | 296/180.5 |
| 6,724,322 B2 * | 4/2004 | Tang et al. .................. | 340/989 |
| 7,845,699 B2 * | 12/2010 | Leopold ..................... | 296/26.04 |
| 2002/0125738 A1 | 9/2002 | Pettey | |
| 2010/0244768 A1 * | 9/2010 | Ghabra et al. .............. | 320/108 |
| 2010/0253535 A1 * | 10/2010 | Thomas et al. ........... | 340/825.24 |
| 2010/0255953 A1 * | 10/2010 | McCullough et al. .......... | 477/94 |
| 2010/0264688 A1 * | 10/2010 | Cheal et al. ................. | 296/146.4 |
| 2012/0259517 A1 * | 10/2012 | Dietewich et al. .............. | 701/49 |

FOREIGN PATENT DOCUMENTS

| | | |
|---|---|---|
| DE | 10 2006 054 986 A1 | 5/2008 |
| EP | 0 865 950 A1 | 9/1998 |
| GB | 2 464 713 A | 4/2010 |

OTHER PUBLICATIONS

German Search Report dated Apr. 3, 2012 with partial English translation (ten (10) pages).

* cited by examiner

*Primary Examiner* — Glenn Dayoan
*Assistant Examiner* — Sunsurraye Westbrook
(74) *Attorney, Agent, or Firm* — Crowell & Moring LLP

(57) ABSTRACT

An aerodynamically effective device for a motor vehicle has an air guiding element, which can be adjusted between an inoperative position and at least one operative position, a drive unit for adjusting the air guiding element and a control device for controlling the drive unit. The control device has an actuating device for actuating the drive unit. The actuating device can be operated from outside the motor vehicle.

12 Claims, 1 Drawing Sheet

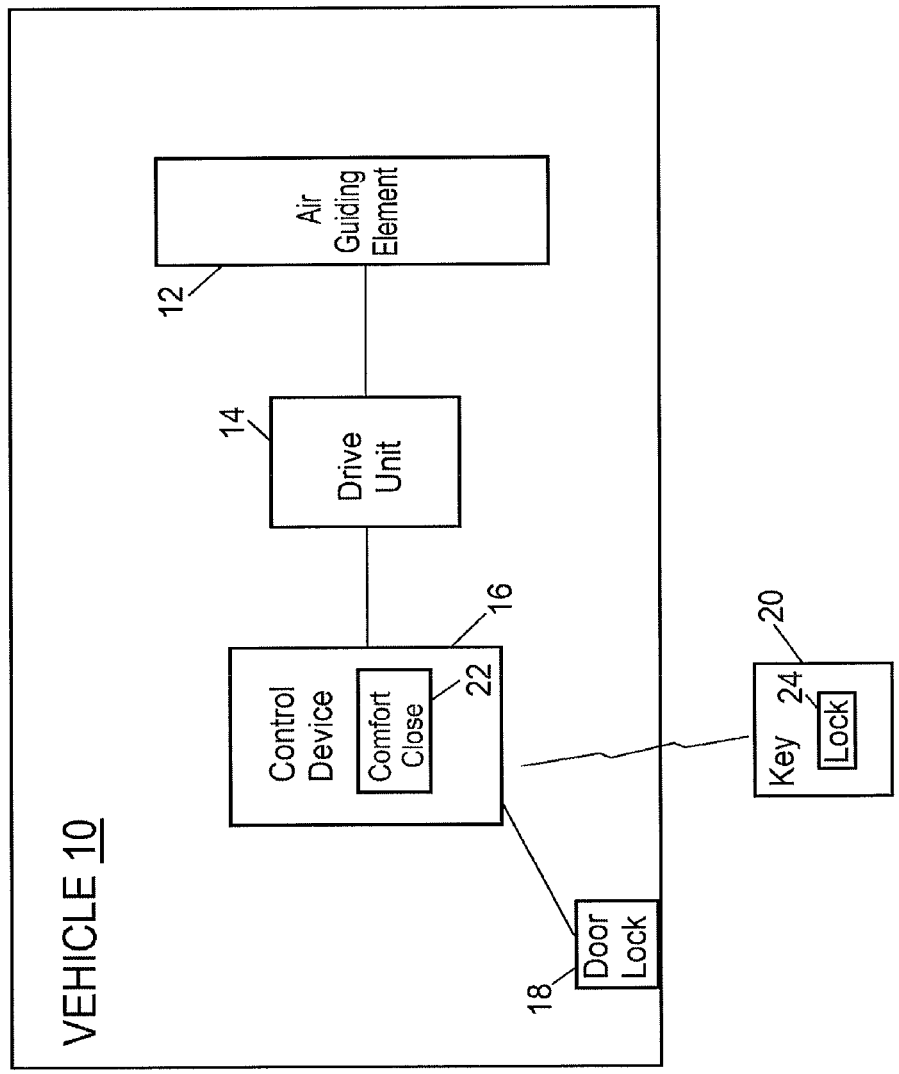

AERODYNAMICALLY EFFECTIVE DEVICE FOR A MOTOR VEHICLE

CROSS-REFERENCE TO RELATED APPLICATION

This application claims priority under 35 U.S.C. §119 from German Patent Application No. DE 10 2011 077 914.0, filed Jun. 21, 2011, the entire disclosure of which is herein expressly incorporated by reference.

BACKGROUND AND SUMMARY OF THE INVENTION

The present invention relates to an aerodynamically effective device for a motor vehicle and to a motor vehicle having such an aerodynamically effective device.

Known aerodynamically effective devices are, for example, rear spoilers or rear wings which can be adjusted by means of a drive unit between an inoperative position and an aerodynamically effective operative position. As a rule, when a certain threshold value speed is exceeded, such rear spoilers or rear wings are adjusted to the operative position for increasing the output of the motor vehicle and, when there is a falling-below a certain threshold value speed, are automatically adjusted to the inoperative position. Furthermore, it is known to provide a control switch for the manual control of the rear spoiler or rear wing in the vehicle interior in order to be able to move the rear spoiler or rear wing out manually for permitting cleaning operations, for example.

It is an object of the present invention to create an aerodynamically effective device for a motor vehicle whose operating comfort is increased, as well as to provide a motor vehicle having such an aerodynamically effective device.

This and other objects are achieved by an aerodynamically effective device for a motor vehicle, having an air guiding element, which can be adjusted between an inoperative position and at least one operative position, a driving device for adjusting the air guiding element, and a control device for controlling the driving device. The control device has an actuating device for actuating the driving device. The actuating device can be operated from outside the motor vehicle. The actuating device is integrated in a door lock and can be operated by operating a door lock, and/or the actuating device has a portable operating element having a transmitter. In addition, this object is achieved by providing a motor vehicle equipped with such an aerodynamically effective device.

In particular, according to the present invention, an aerodynamically effective device for a motor vehicle has an air guiding element, which can be adjusted between an inoperative position and at least one operative position, a driving device for adjusting the air guiding element and a control device for controlling the driving device. In this case, the control device has an actuating device for actuating the driving device. The actuating device can be operated from outside the motor vehicle.

As a result, it becomes possible to direct or to control an adjusting of the air guiding element between different positions from outside the driving device.

An actuating device may be any device that is capable of generating an actuating signal, so that the control device can command an adjusting of the air guiding element by the driving device.

In particular, the motor vehicle may be a passenger car or a sports car.

Furthermore, when the actuating device is operated, the aerodynamically effective device can adjust the driving device of the air guiding element to the inoperative position. In this case, the operation may take place manually as well as automatically. As a result, a person who is situated outside the vehicle can adjust or shift the air guiding element to the inoperative position without having to enter the vehicle.

In the case of the aerodynamically effective device for a motor vehicle, the actuating device can advantageously be integrated in a door lock and can be actuated by operating the door lock. Operating the door lock may, for example, mean a turning of a mechanical key to a locking position of the door lock. Furthermore, operating the door lock may mean a touching of the door handle, for example, over a certain time period, or a moving of the door handle.

The aerodynamically effective device can thereby be adjusted to the inoperative position, for example, when the motor vehicle door is locked by way of a mechanical key or by moving or touching the door handle. No separate actuating device is required for this purpose.

Furthermore, in the case of the aerodynamically effective device for a motor vehicle, the actuating device may advantageously be a portable operating element having a transmitter. The driving device can thereby be controlled in a non-contact, i.e. remote-controlled, manner for adjusting the air guiding element also at a certain distance from the motor vehicle. In particular, the portable operating element may be a radio remote control. A radio remote control represents a wireless communication connection.

As a further development of the aerodynamically effective device having the portable operating element, an automatic operation of the portable operating element can take place when a predefined distance of the portable operating element from the motor vehicle is exceeded.

It is hereby ensured that, when the person with the operating element moves away from the vehicle, the driving device for adjusting the air guiding element is actuated in every case, particularly for adjusting the air guiding element to the inoperative position, so that the air guiding element is adjusted to the inoperative position in a manner that is, for example, safe from vandalism or the like, at the motor vehicle.

According to a further development of the aerodynamically effective device having the portable operating element, the latter can be constructed such that an actuating signal is effective only in close proximity to the motor vehicle.

It is thereby ensured that an adjustment of the air guiding element will take place only if the person with the portable operating element is situated close to the motor vehicle and can therefore monitor and see the adjustment of the air guiding element, for example, into the inoperative position.

According to a further development of the aerodynamically effective device having the portable operating element, the latter is integrated in a vehicle key. No separate operating element will therefore be necessary. Thus, a vehicle key may be any portable device that permits a locking of the motor vehicle, whether mechanically or electronically/electrically.

In the case of the aerodynamically effective device according to the present invention, when the actuating device is operated it can simultaneously cause a central locking of doors and hatches of the motor vehicle and/or a closing of vehicle body openings, such as windows and roof openings, of the motor vehicle.

As a result, a closing or adjusting of the air guiding element into its inoperative position can be integrated in connection with a so-called "comfort closing function" of the motor vehicle, during which, for example, when an operating element on the vehicle key is operated for a longer period of time, movable vehicle elements, such as windows, and aerodynamically effective devices are changed to closed or inoperative positions.

Advantageously, the air guiding element of the aerodynamically effective device can be mounted at the rear of the motor vehicle and is constructed, for example, as a rear spoiler or rear wing.

Other objects, advantages and novel features of the present invention will become apparent from the following detailed description of one or more preferred embodiments when considered in conjunction with the accompanying drawing.

BRIEF DESCRIPTION OF THE DRAWING

The FIGURE is a simplified block diagram of an exemplary embodiment according to the present invention.

DETAILED DESCRIPTION OF THE DRAWING

Referring to the FIGURE, a vehicle 10 is equipped with an aerodynamically effective device. The aerodynamically effective device includes an air guiding element 12, which is adjustable between an inoperative position and at least one operative position, a drive unit 14 for adjusting the air guiding element 12, and a control device 16 for controlling the drive unit 14. The control device 16 has an actuating device for actuating the drive unit 14. The actuating device may be operable from outside the motor vehicle such as by being integrated in a door lock 18 or as a portable operating element 20 such as a vehicle key having a transmitter.

The embodiment of the present invention relates to an extensible spoiler which is used as an aerodynamically effective device according to the present invention. The spoiler is fastened to a rear of a motor vehicle and can be adjusted between an inoperative and an operative position. A drive unit having a driving motor is provided for this purpose. In its inoperative position, the spoiler is constructed flush with the surrounding vehicle body elements in a hatchback at the rear of the motor vehicle.

In an automatic actuating mode of the spoiler, the spoiler is automatically extended when a first defined threshold value is reached. In turn, the spoiler is automatically retracted when there is a falling below a second defined threshold value speed.

In addition, a manual actuating mode of the spoiler is provided. For this purpose, an operating element is mounted on the dashboard in the vehicle interior in order to manually retract and extend the spoiler, as desired. For example, when the vehicle is stopped, this has the purpose of carrying out servicing work at the spoiler or carrying out cleaning operations.

The motor vehicle of the present embodiment also has a comfort closing function 22 which is capable of operating only in close proximity of the motor vehicle, for example, in a radius of approximately 3 meters around the motor vehicle. This so-called comfort closing function is operated by use of a locking button 24 on the vehicle key 20. The closing function is designed such that, when the locking button is briefly pressed once, a central locking system of the motor vehicle is activated and the motor vehicle is locked. For a comfort closing, the operator has to keep the locking button at the vehicle depressed. During the comfort closing, not only the central locking system of the motor vehicle is activated but windows and sliding roofs are also closed as long as the locking button is held in a depressed condition. Likewise, the rear spoiler is retracted as long as the locking button at the vehicle key is held in a depressed state. If the operator releases the locking button before the spoiler has completely moved into its inoperative position, the spoiler will be adjusted completely back into its operative position in order to release possibly squeezed-in objects and prevent the spoiler from stopping in an undesired intermediate position. If the locking button at the motor vehicle key is held in a depressed condition until the spoiler has been adjusted completely into its inoperative position, the spoiler will remain in its inoperative position.

By way of the comfort closing function of the embodiment of the present invention, an operator can therefore retract the spoiler from outside the motor vehicle without having to enter the motor vehicle for this purpose. This considerably increases the manual comfort when operating the spoiler, in which case no additional parts or operating elements are provided because the locking button at the motor vehicle key is used for this purpose, which operating button is present anyhow. In other words, the manual retracting of the spoiler is integrated in a known comfort closing function of the motor vehicle.

The restriction of the comfort closing function to the close proximity around the vehicle, particularly the comfort closing function of the spoiler, makes it possible for the operator to always be in the proximity of the motor vehicle as long as he is operating the comfort closing function of the motor vehicle, so that he can see the motor vehicle and can easily notice a squeezing-in of objects, for example, into the spoiler.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
   an air guiding element adjustable between an inoperative position and at least one aerodynamically effective operative position on the motor vehicle;
   a drive unit operatively configured for adjusting the air guiding element between the inoperative position and the at least one aerodynamically effective operative position when a predetermined threshold speed value is exceeded;
   a control device operatively configured for controlling the drive unit that adjusts the air guiding element;
   wherein the control device comprises an actuating device for actuating the drive unit, wherein at least one of:
      the actuating device is operable from outside the motor vehicle,
      the actuating device is integrated in a door lock and is operable by operating the door lock, and
      the actuating device includes a portable operating element having a transmitter.

2. The motor vehicle according to claim 1, wherein the motor vehicle is a passenger car.

3. The motor vehicle according to claim 1, wherein operation of the actuating device adjusts the air guiding element to an inoperative position, said operating of the actuating device being carried out at least one of automatically and manually.

4. The motor vehicle according to claim 3, wherein an automatic operation of the actuating device having the portable operating element occurs when a predefined distance of the portable operating element from the motor vehicle is exceeded.

5. The motor vehicle according to claim 3, wherein the actuating device having the portable operating element is operatively configured so that an actuating signal is effective only in a close proximity of the motor vehicle.

6. The motor vehicle according to claim 1, wherein an automatic operation of the actuating device having the portable operating element occurs when a predefined distance of the portable operating element from the motor vehicle is exceeded.

7. The motor vehicle according to claim 6, wherein the portable operating element of the actuating device is integrated in a vehicle key.

8. The motor vehicle according to claim 1, wherein the actuating device having the portable operating element is operatively configured so that an actuating signal is effective only in a close proximity of the motor vehicle.

9. The motor vehicle according to claim 8, wherein the portable operating element of the actuating device is integrated in a vehicle key.

10. The motor vehicle according to claim 1, wherein the portable operating element of the actuating device is integrated in a vehicle key.

11. The motor vehicle according to claim 1, wherein operation of the actuating device simultaneously causes at least one of a central locking of doors of the motor vehicle and a closing of windows of the motor vehicle.

12. The motor vehicle according to claim 1, wherein the air guiding element is mountable on a rear of the motor vehicle as one of a rear spoiler and rear wing.

\* \* \* \* \*